(12) United States Patent
Lucrecio et al.

(10) Patent No.: US 9,941,748 B2
(45) Date of Patent: Apr. 10, 2018

(54) OPTICAL COMMUNICATION AND CHARGING DEVICE AND METHOD OF USE

(71) Applicant: Flextronics AP, LLC, San Jose, CA (US)

(72) Inventors: Armando J. Lucrecio, Fremont, CA (US); Jiayin Ma, Palo Alto, CA (US); Shaily Deva, Saratoga, CA (US)

(73) Assignee: Flextronics AP, LLC, San Jose, CA (US)

( * ) Notice: Subject to any disclaimer, the term of this patent is extended or adjusted under 35 U.S.C. 154(b) by 5 days.

(21) Appl. No.: 15/134,084

(22) Filed: Apr. 20, 2016

(65) Prior Publication Data

US 2017/0019180 A1 Jan. 19, 2017

Related U.S. Application Data (60) Provisional application No. 62/193,037, filed on Jul. 15, 2015, provisional application No. 62/210,303, filed on Aug. 26, 2015, provisional application No. 62/212,844, filed on Sep. 1, 2015, provisional application No. 62/214,362, filed on Sep. 4, 2015, provisional application No. 62/216,861, filed on Sep. 10, 2015, provisional application No. 62/195,726, (Continued)

(51) Int. Cl.
| | |
|---|---|
| H04B 10/43 | (2013.01) |
| H02J 50/30 | (2016.01) |
| H02J 7/02 | (2016.01) |
| H04B 10/114 | (2013.01) |
| H04B 10/80 | (2013.01) |
| H02J 7/35 | (2006.01) |
| H02J 50/80 | (2016.01) |

(52) U.S. Cl.
CPC ............ *H02J 50/30* (2016.02); *H02J 7/025* (2013.01); *H04B 10/1143* (2013.01); *H04B 10/807* (2013.01); *H02J 7/355* (2013.01); *H02J 50/80* (2016.02)

(58) Field of Classification Search
CPC .. H04B 10/43; H04B 10/1143; H04B 10/807; H02J 7/355; H02J 7/025
See application file for complete search history.

(56) References Cited

U.S. PATENT DOCUMENTS

| | | | |
|---|---|---|---|
| 7,621,677 B2 | 11/2009 | Yang et al. | |
| 2004/0142733 A1* | 7/2004 | Parise | B01F 5/0614 |
| | | | 455/572 |

(Continued)

FOREIGN PATENT DOCUMENTS

| | | |
|---|---|---|
| DE | 69634441 | 4/2006 |
| DE | 102012018616 | 3/2014 |
| WO | WO 2009/045188 | 4/2009 |

OTHER PUBLICATIONS

Official Action for German Patent Application No. 102016113142.3, dated Apr. 13, 2017 15 pages.

*Primary Examiner* — Dzung Tran
(74) *Attorney, Agent, or Firm* — Sheridan Ross P.C.

(57) ABSTRACT

Techniques for remote interactions with devices, such as charging, communications, and user interaction, are provided. Specifically, systems and methods to provide charging of devices, such as, remote charging by photovoltaic (PV) cells, infrared (IR) illumination, audio signals, and LEDs such as laser LEDs to charge devices such as watches, jewelry, car panels, headphones and phones, are presented.

18 Claims, 6 Drawing Sheets

Related U.S. Application Data filed on Jul. 22, 2015, provisional application No. 62/197,321, filed on Jul. 27, 2015.

(56) References Cited

U.S. PATENT DOCUMENTS

| | | |
|---|---|---|
| 2004/0266367 A1* | 12/2004 | Tuominen ............ H04B 10/807 |
| | | 455/91 |
| 2007/0031089 A1 | 2/2007 | Tessnow et al. |
| 2007/0069684 A1 | 3/2007 | Ramsden |
| 2011/0261354 A1* | 10/2011 | Sinfield ..................... G01J 3/02 |
| | | 356/301 |
| 2013/0314028 A1 | 11/2013 | Tseng |
| 2014/0132201 A1 | 5/2014 | Tsang |
| 2014/0217955 A1 | 8/2014 | Lin et al. |
| 2016/0108728 A1* | 4/2016 | Freese ................... E21B 47/122 |
| | | 166/250.01 |
| 2016/0134794 A1* | 5/2016 | Grabau ............. G06K 9/00771 |
| | | 348/155 |
| 2017/0018957 A1* | 1/2017 | Lucrecio .................. H02J 7/35 |
| 2017/0059763 A1 | 3/2017 | Lucrecio et al. |
| 2017/0070292 A1 | 3/2017 | Lucrecio et al. |

* cited by examiner

OPTICAL COMMUNICATION AND CHARGING DEVICE AND METHOD OF USE

CROSS REFERENCE TO RELATED APPLICATIONS

The present application claims the benefits of and priority, under 35 U.S.C. § 119(e), to U.S. Provisional Application Ser. Nos. 62/193,037, filed on Jul. 15, 2015, entitled "Remote Device Charging;" 62/210,303, filed on Aug. 26, 2015, entitled "Diffusive Optical Fiber as Ambient Light Sensors, Optical Signal Transceiver, Proximity Sensor," 62/212,844, filed on Sep. 1, 2015, entitled "Diffusive Optical Fiber as Ambient Light Sensors, Optical Signal Transceiver, Proximity Sensor," 62/214,362, filed on Sep. 4, 2015, entitled "Laser Charging and Optical Bi-Directional Communications Using Standard USB Terminals," 62/216,861, filed on Sep. 10, 2015, entitled "Diffusive Optical Fiber as Ambient Light Sensors, Optical Signal Transceiver, Proximity Sensor," 62/195,726, filed on Jul. 22, 2015, entitled "Remote Device Charging," and 62/197,321, filed on Jul. 27, 2015, entitled "Device Communication, Charging and User Interaction."

This application is also related to U.S. patent application Ser. Nos. 14/937,553, filed on Nov. 10, 2015, entitled "Laser and Optical Charging and Communications Device and Method of Use," and 14/942,210, filed Nov. 16, 2015, entitled "LED and Laser Light Coupling Device and Method of Use," the entire disclosures of which are hereby incorporated by reference, in their entirety, for all that they teach and for all purposes.

FIELD

The disclosure relates generally to remote charging of devices, such as, remote charging by photovoltaic (PV) cells, infrared (IR) illumination, audio signals, and LEDs such as laser LEDs to charge devices such as watches, jewelry, car panels, headphones and phones.

BACKGROUND

Electronic devices require regular power charging. Existing means to charge electronic devices, such as watches and jewelry, require a contacted (ie physical) solution for charging, e.g. through USB, electrical cord, etc. There currently exist no solutions that provide charging in a contactless manner, eg that are wireless. A solution that allows non-physical connection enables charging without physical connection, as well as other interactions with a device, e.g. software updates and configuration updates. These and other needs are addressed by the various aspects, embodiments, and/or configurations of the present disclosure.

By way of providing additional background, context, and to further satisfy the written description requirements of 35 U.S.C. §112, the following references are incorporated by reference in their entireties: U.S. Pat. Pub. Nos. 2013/0314028 to Tseng; 2014/0132201 to Tsang, U.S. Pat. Pub. No. 2007/0031089 to Tessnow and U.S. Pat. No. 7,621,677 to Yang.

SUMMARY

The disclosure provides techniques for remote interactions with devices, such as charging, communications, and user interaction, are provided. Specifically, systems and methods to provide charging of devices, such as, remote charging by photovoltaic (PV) cells, infrared (IR) illumination, audio signals, and LEDs such as laser LEDs to charge devices such as watches, jewelry, car panels, headphones and phones, are presented.

In one embodiment, an optical communications and charging system is disclosed, the system comprising: a transmitter/charger configured to receive a first communications signal and a power signal from an external source, the transmitter/charger comprising a light source configured to transmit the first communications signal and the power signal; a lens configured to receive the first communications signal and the power signal; a target device comprising a battery and a PV cell in communication with the battery, the target device configured to receive the first communications signal and the power signal, the target device configured to transmit a second communications signal to the transmitter/charger; wherein the power signal received by the target device enables the PV cell to charge the battery.

In another embodiment, a method of optical communications and charging is disclosed, the method comprising: providing an optical communications and charging system comprising: a transmitter/charger configured to receive a first communications signal and a power signal from an external source, the transmitter/charger comprising a light source configured to transmit the first communications signal and the power signal; a lens configured to receive the first communications signal and the power signal; and a target device comprising a battery and a PV cell in communication with the battery, the target device configured to receive the first communications signal and the power signal, the target device configured to transmit a second communications signal to the transmitter/charger; engaging the transmitter/charger charging device with an external source; providing at least one of a first communications signal and a power signal to the transmitter/charger from the external source; transmitting the at least one least one of a first communications signal and a power signal from the transmitter/charger to the target device; determining if the at least one of a first communications signal and a power signal comprises a power signal; wherein in the at least one of a first communications signal and a power signal comprises a power signal, the PV cell receives the power signal and the battery is charged.

In yet another embodiment, an optically-activated switch device is disclosed, the device comprising: a light source configured to be disposed within an electronic device, the light source configured to emit an optical signal; and a surface barrier configured to be disposed on a surface of the electronic device and configured to receive the optical signal, the surface barrier having an internal reflective surface and an external surface; wherein the internal reflective surface reflects the optical signal to provide a first switch state when no external source contacts the external surface, and provides a second switch state when an external source contacts the external surface.

In further embodiments, the device, system and/or method comprise the following features: the light source is a laser/LED diode; the power received by the transmitter/charger is received via at least one of a USB connector and a wireless connector; the transmitter/charger and the lens are components of a common enclosure structure; the common enclosure structure further comprises a photon detector configured to receive the second communications signal; the target device outputs the second communications signal to the photon detector; a modulator configured to manage the first and the second communications signals; the first communication signal comprises data to enable a software update of the targeted device; and the target device and the common enclosure structure of transmitter/charger are not in physical communication, and the light source wirelessly transmits the first communications signal and the power signal.

BRIEF DESCRIPTION OF THE DRAWINGS

For a more complete understanding of the present disclosure and its advantages, reference is now made to the following description taken in conjunction with the accompanying drawings, in which like reference numerals represent like parts.

It should be understood that the drawings are not necessarily to scale. In certain instances, details that are not necessary for an understanding of the invention or that render other details difficult to perceive may have been omitted. It should be understood, of course, that the invention is not necessarily limited to the particular embodiments illustrated herein.

To assist in the understanding of the present invention the following list of components and associated numbering found in the drawings is provided herein:

| Number | Component |
| --- | --- |
| 100 | System |
| 200 | Light Transmitter/Charger |
| 226 | Light Transmitter/Charger Communication Ports |
| 230 | Light Transmitter Power |
| 240 | External Modulation Source |
| 242 | External Modulation Source Signal |
| 250 | Microprocessor/controller |
| 260 | Light Transmitter/Charger LED Transmitter |
| 270 | Photon Detector |
| 272 | Photon Detector Signal |
| 276 | Light Transmitter/Charger Receiver |
| 280 | Diffusive Fiber |
| 282 | Power One |
| 284 | (Bi-directional) Optical Communication One |
| 290 | Lens |
| 292 | Power Two |
| 294 | Optical Communication Two |
| 300 | Target Device |
| 310 | Target Device Controller |
| 312 | Target Device Solar Cells |
| 320 | Demodulated Signal |
| 370 | Target Device LED |
| 372 | Target Device LED Communication Signal |
| 382 | Power Three |
| 384 | Optical Communication Three |
| 390 | Receiver Battery |
| 392 | Receiver Modulator |
| 400 | External Device |
| 410 | External Device Communication Ports |
| 482 | External Device Power |

-continued

| Number | Component |
| --- | --- |
| 484 | External Device Modulated Communications Signal |
| 500 | Trigger Switch |
| 510 | Light Source |
| 520 | Surface Barrier |
| 524 | Surface Barrier Internal Reflective Surface |
| 528 | Surface Barrier Exterior Surface |
| 530 | Host Device |
| 540 | Optical Signal |
| 550 | Exterior Source |

DETAILED DESCRIPTION

In the following detailed description, numerous specific details are set forth in order to provide a thorough understanding of the disclosed techniques. However, it will be understood by those skilled in the art that the present embodiments may be practiced without these specific details. In other instances, well-known methods, procedures, components and circuits have not been described in detail so as not to obscure the present disclosure.

Although embodiments are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, a communication system or subsystem, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Although embodiments are not limited in this regard, the terms "plurality" and "a plurality" as used herein may include, for example, "multiple" or "two or more". The terms "plurality" or "a plurality" may be used throughout the specification to describe two or more components, devices, elements, units, parameters, circuits, or the like.

The term "PV" means photovoltaic and generally refers to a means or method of converting light or solar energy into electricity.

The term "PV array" means at assembly of PV cells or modules.

The term "USB" means universal serial bus and refers to hardware, such as cables and connectors, and communications protocols used in a bus for connection, communication and/or power transfer.

The term "USB protocol" means a USB communication protocol.

The term "USB connector" or "USB hardware connector" refers to a physical USB connector.

The term "wireless USB" refers to wireless communication using USB protocols.

The term "modulation" refers to the process of varying properties of a waveform or carrier signal with a modulating signal that contains information to be transmitted.

The term "demodulation" refers to the process of extracting the original information-bearing signal from the modulated waveform or carrier signal.

The term "modulator" refers to a device that performs modulation.

The term "demodulator" refers to a device that performs demodulation.

The term "LED" means Light-Emitting Diode and refers to a semiconductor that converts an electrical current into light, and includes all available LEDs types such as surface-emitting LEDs and edge-emitting LEDs.

The term "light coupling" means providing or supplying light to or into a fiber.

The term "waveguide" means a structure that guides waves of light.

The term "fiber optics" or "optical fiber" means a flexible, transparent fiber made by drawing glass/silica or plastic.

Before undertaking the description of embodiments below, it may be advantageous to set forth definitions of certain words and phrases used throughout this document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, interconnected with, contain, be contained within, connect to or with, couple to or with, be communicable with, cooperate with, interleave, juxtapose, be proximate to, be bound to or with, have, or the like; and the term "controller" means any device, system or part thereof that controls at least one operation, such a device may be implemented in hardware, circuitry, firmware or software, or combination of at least two of the same. It should be noted that the functionality associated with any particular controller may be centralized or distributed, whether locally or remotely. Definitions for certain words and phrases are provided throughout this document and those of ordinary skill in the art should understand that in many, if not most instances, such definitions apply to prior, as well as future uses of such defined words and phrases.

For purposes of explanation, numerous details are set forth in order to provide a thorough understanding of the present techniques. It should be appreciated however that the present disclosure may be practiced in a variety of ways beyond the specific details set forth herein. Furthermore, while the exemplary embodiments illustrated herein show various components of the system collocated, it is to be appreciated that the various components of the system can be located at distant portions of a distributed network, such as a communications network, node, and/or the Internet, or within a dedicated secured, unsecured, and/or encrypted system and/or within a network operation or management device that is located inside or outside the network. As an example, a wireless device can also be used to refer to any device, system or module that manages and/or configures or communicates with any one or more aspects of the network or communications environment and/or transceiver(s) and/or stations and/or access point(s) described herein.

Thus, it should be appreciated that the components of the system can be combined into one or more devices, or split between devices.

Furthermore, it should be appreciated that the various links, including the communications channel(s) connecting the elements can be wired or wireless links or any combination thereof, or any other known or later developed element(s) capable of supplying and/or communicating data to and from the connected elements. The term module as used herein can refer to any known or later developed hardware, circuit, circuitry, software, firmware, or combination thereof, that is capable of performing the functionality associated with that element. The terms determine, calculate, and compute and variations thereof, as used herein are used interchangeable and include any type of methodology, process, technique, mathematical operational or protocol.

With attention to FIGS. 1-4, embodiments of the charging and optical communication system 100 are depicted.

Generally, in one embodiment, a bi-directional optical communication and configuration between charger and component is described. In one particular example, features comprise: i) contactless charging to a device, such as jewelry, watch, etc, when the device is placed within the line of sight between the devices (bi-directional optical communication and configuration); ii) software update, information upload and information download when the device is placed within the line of sight between the devices; and iii) a venue for a user to update a configuration through a communication device, such as PC, mobile phone, tablet, etc. Further features may comprise: a) a charger unit which communicates directly with the "jewelry" component to configure firmware and send a signal, and send power, etc; b) charger will also have an MCU and USB connector for WiFi, BT, 4G communication to PC, etc; c) a low speed protocol optimized for close optical proximity over air; and d) an optical filter suitable for both charger and component.

In another embodiment, optical remote charging of a small device is provided. That is, in one example, PV cell charging of a space restricted component, i.e. watch, jewelry, etc. may be provided. Further, the optical charge may use IR illumination in close proximity.

Figure 1A:
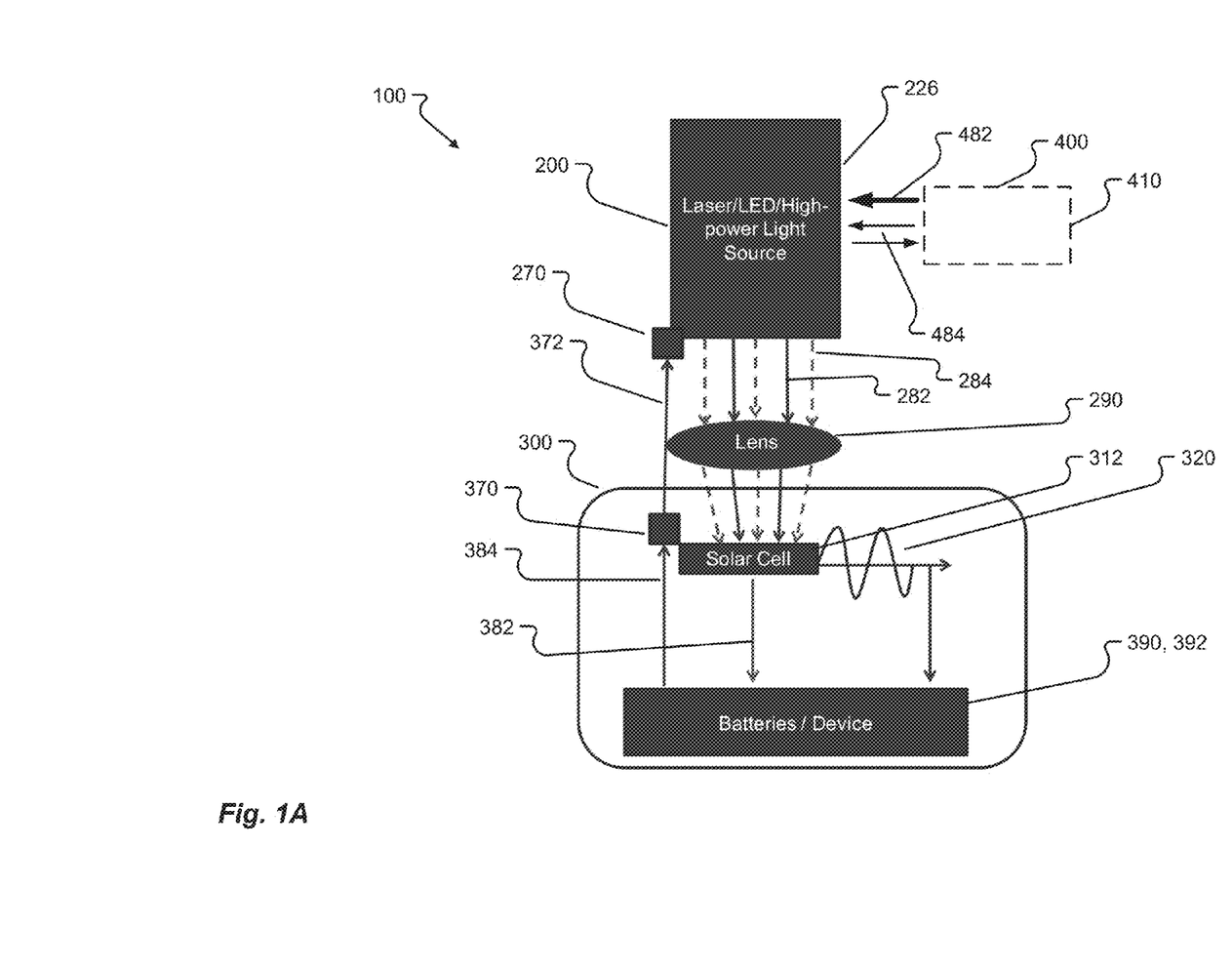
FIG. 1A provides a representation of one embodiment of the charging and optical communication system.
Figure 1B:
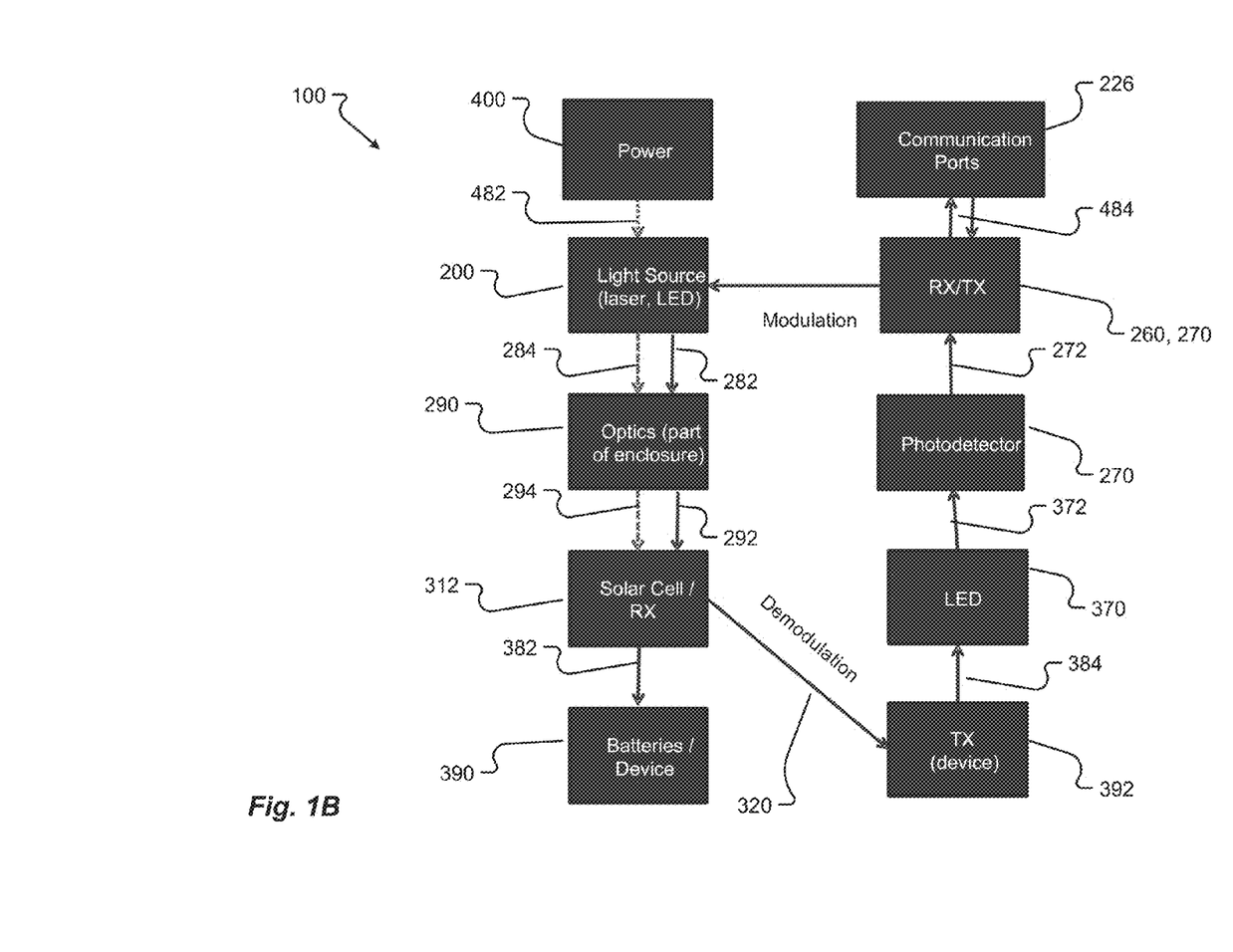
FIG. 1B provides a block diagram of the embodiment of the charging and optical communication system of FIG. 1A.
Figure 1C:
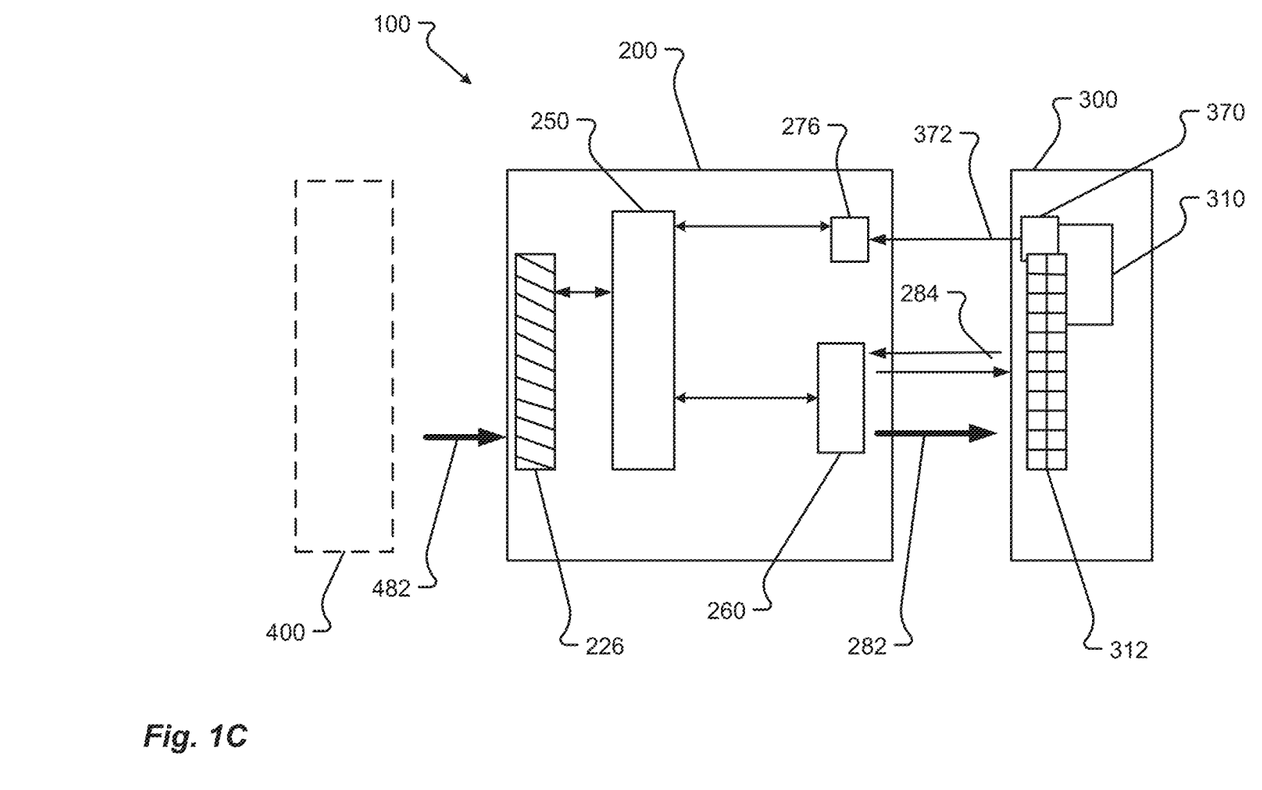
FIG. 1C a representation of another embodiment of the charging and optical communication system.

With focus on FIGS. 1A-C, embodiments of the charging and optical communication system 100 are provided.

Generally, the system 100 comprises a light transmitter/charger 200, lens 290, target device 300 and external device 400. The transmitter/charger 200 comprises a photon detector 270, light transmitter/charger communication ports 226, microprocessor/controller 250, transmitter/charger receiver 276 and transmitter/charger LED transmitter 260. The transmitter/charger 200 emits one or both of power one 282 and optical communication one 284. External device 400 comprises external device communication ports 410, and outputs external device power 482, and communicates with transmitter/charger 200 by way of external device modulated communications signals 484. Target device 300 comprises solar cell 312 which outputs demodulated signal 320 and power three 382 signal to receiver battery 390 and receiver modulator 392. Receiver modulator 392 outputs optical communication three 384 to photon detector 270.

The transmitter/charger 200 receives electrical power, i.e. external device power 482, from one or more external sources, such as a standard wall outlet, a personal computer, or a laptop computer, and may be a wireless connection. The external device power 482 may be received at transmitter/charger 200 by way of any standard interface known to those skilled in the art, such as a USB interface. The transmitter/charge microprocessor/controller 250 may receive power and distribute power within transmitter/charger 200, to include power to one or more of transmitter/charger receiver 276 and transmitter/charger LED transmitter 260. The transmitter/charge microprocessor/controller 250 may control one or more of transmitter/charger receiver 276 and transmitter/charger LED transmitter 260. That is, the transmitter/charge microprocessor/controller 250 may deliver power to and control the light source (such as an LED and/or laser) used to power and/or communicate with target device 300. The transmitter/charge microprocessor/controller 250 may emit power signal power one 282 to target device, as received by target device solar cells 312. The transmitter/charge microprocessor/controller 250 may optically communicate, one-way or two-way, with target device 300 through optical communication one 284 signal(s). Target device 300 may process/receive the power signal power one 282 and/or optical communication one 284 signal(s) by way of target device controller 310. Target device controller 310 may control and/or provide power to target device LED 370, which emits or broadcasts or transmits target device LED communication signal 372 to transmitter/charger 200. Target device controller 310 and/or transmitter/charge microprocessor/controller 250 may comprise LED driver circuits to power and/or control LED or laser components, e.g. target device LED 370 and transmitter/charger LED transmitter 260, respectively, or other components. LEDs or lasers of target device 300 and/or charger/transmitter 200 transform electrical energy into light energy.

Light transmitter/charger comprises a modulator to accept and/or receive a modulated optical communication signal from external device 400. The transmitter/charger modulator modulates optical communication functions, such as receiving modulated communication signals 484 from external device 400. The transmitter/charger modulator may modulate the received laser light in any manner known to those skilled in the art, to include as amplitude modulation, phase modulation and/or polarization modulation.

Target device 300 may comprise a modulator to accept and/or receive a modulated optical communication signal 284 from transmitter/charger 200 (in one embodiment, by way of lens 290). The target device modulator modulates optical communication functions, such as receiving modulated communication signals 284 from transmitter/charger 200. The target device modulator may modulate the received laser light in any manner known to those skilled in the art, to include as amplitude modulation, phase modulation and/or polarization modulation.

Photon detector 270 is interconnected with transmitter/charger 200 and receives target device laser/LED diode signal 372 as emitted from target device 300 (more specifically, in some embodiments, from or as controlled by target device controller 310). Photon detector 270 is in communication with transmitter/charger 200 and may provide a signal to transmitter/charger 200 indicating receipt or non-receipt of laser/LED diode signal 372. In one embodiment, the transmitter/charger 200 only operates the laser 230 transmitter/charger LED transmitter 260 (that is, sends a signal to the transmitter/charger LED transmitter 260 to activate and emit laser light) when the transmitter/charger 200 is in receipt of a signal from the photon detector 270 that a laser/LED diode signal 372 has been affirmatively received.

In one embodiment, target device solar cells 312 receive laser light emitted from LED transmitter 260 (in some embodiments after passing through lens 290) by way of a diffuser film.

The laser/LED diode signal 372 may function, in addition to optical communication, to establish communication between the transmitter/charger 200 and the target device 300, and may also function as a safety device as discussed above (that is, serving to activate or not activate the LED/laser transmitter 260).

Target device solar cells 312 convert received laser light (as emitted by LED transmitter 260 and identified as power one 282 signal) into electrical power as output as power two 382. The electrical power output by solar cells 312 may comprise any format as known to those skilled in the art, to include 120 Volt at 60 Hz and 230 Volt at 50 Hz. In one embodiment the electrical power output by solar cells 312 is of USB protocol.

In one embodiment, one or both of transmitter/charger 200, target device 300 and external device 400 may comprise a USB interface, employ USB protocols, wireless USB, and any USB hardware interface known to those skilled in the art, to include micro-USB, mini-USB and standard USB hardware interfaces.

In another embodiment, the transmitter/charger 200 solely performs optical (i.e. laser-based) charging, wherein power provided by the external device 400 comprises power provided by any commercially available electronic device, such as a laptop computer, personal computer, and smartphone.

In one embodiment, the transmitter/charger 200 solely performs optical (i.e. laser-based) communication between the transmitter/charger 200 and the target device 300, or between the external device 400 and the target device 300 by way of the transmitter/charger 200.

In one embodiment, the transmitter/charger 200 comprises its own power supply, such as a battery such as a lithium battery, so as to power the laser and provide any set of functions disclosed above, such as charging and optical communication.

In one embodiment, the transmitter/charger 200 may operate in any of three selectable modes: power charging only, optical communications only, and both power charging and optical communications.

In one embodiment, the transmitter/charger 200 outputs bi-directional optical communications 284 with the target device 300, wherein the optical communications comprise communication protocols optimized for selectable parameters, e.g. physical separation geometries between the transmitter/charger 200 and the target device 300 or capabilities of the target device 400. More specifically, the specialized or optimized communication protocols may be tuned to charge optically communicate with a smartwatch or other piece of jewellery in close optical proximity to the transmitter/charger 200.

With specific reference to FIG. 1B, further details of the system 100 are provided. External device 400 outputs power, such as electrical power, by way of external device power 482 to transmitter/charger 200. Transmitter/charger 200 receives external device power 482 and also receives a modulated optical communication signal emitted or supplied by the targeted device, that is, the optical communication three 384 signal emitted by the receiver modulator 392 of the target device 300. In one embodiment, to include that of FIG. 1B, the lens 290 and the transmitter/charger 200 form part of a physical enclosure. Lens 290 receives one or more of power one 282 and optical communication one 284, and transmits one or more of power two 292 and optical communication two 294 to target device solar cells 312. The target device solar cells 312 convert the received power two 292 (i.e. light or optical energy) to electrical energy to charge battery 390. The target device solar cells 312, in combination with a target device receiver, demodulate the received modulated optical signal and transmit the demodulated signal to the receiver modulator 392 of the target device 300.

With reference to FIGS. 1A-C, FIG. 2 provides a flow chart illustrating an exemplary method of use of the charging and optical communication system 100. Generally, the method 500 starts at step 504 and ends at step 544. The method 500 can include more or fewer steps or can arrange the order of the steps differently than those shown in FIG. 2.

Figure 2:
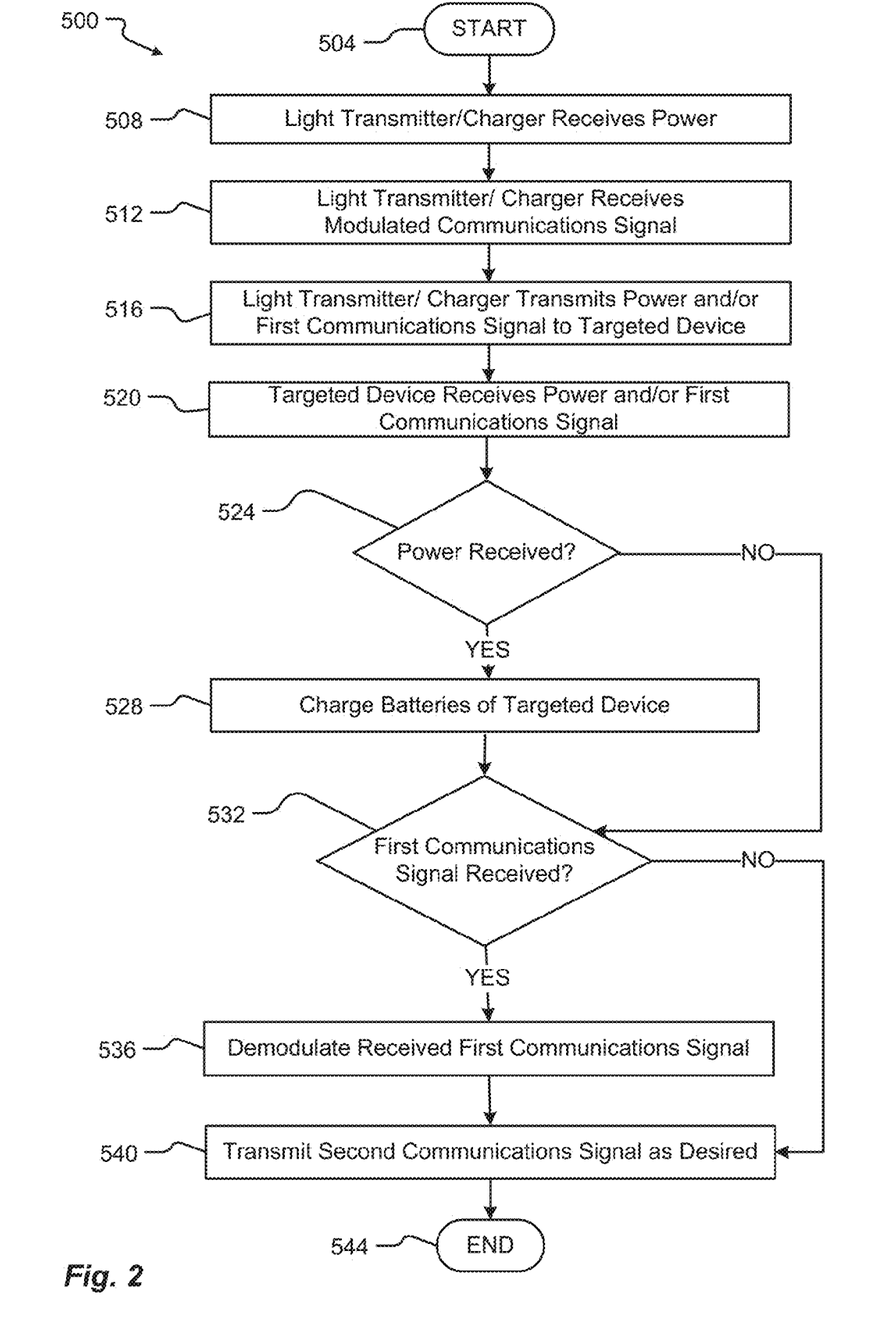
FIG. 2 provides a flow chart of a method of use of the charging and optical communication system of FIGS. 1A-B.

At step 508 the light transmitter/charger 200 receives power from external device 400. At step 512, the light transmitter/charger 200 receives a modulated communications signal from the external device 400. (In some embodiments, the light transmitter/charger 200 generates its own modulated communications signal). At step 516, the light transmitter/charger 200 transmits one or both of the power signal (e.g. light energy, such as an LED emitted optical power signal) and the modulated (optical) communications signal to the target device 300. (In some embodiments, the light transmitter/charger 200 performs signal processing to the received modulated communications, for example, noise reduction processing). At step 520, the target device 300 receives one or both of the power signal and the modulated communications signal.

At step 532, a query is made as to whether power was received by the target device. If the answer is Yes, the power (optical signal, i.e. optical power signal) is provided to the solar (e.g. PV) cells of the target device and the battery of the target device is charged; the method then continues to step 536. If the answer to the query is No, the method proceeds to step 532.

At step 532, a query is made as to whether a first (optical) communication signal was received by the target device. If the answer is Yes, the method continues to step 536 wherein the received communications signal is demodulated and the method proceeds to step 540. If the answer is No, the method proceeds to step 540.

At step 540, the target device transmits a second (optical) communications signal as desired. The method ends at step 544.

Figure 3:
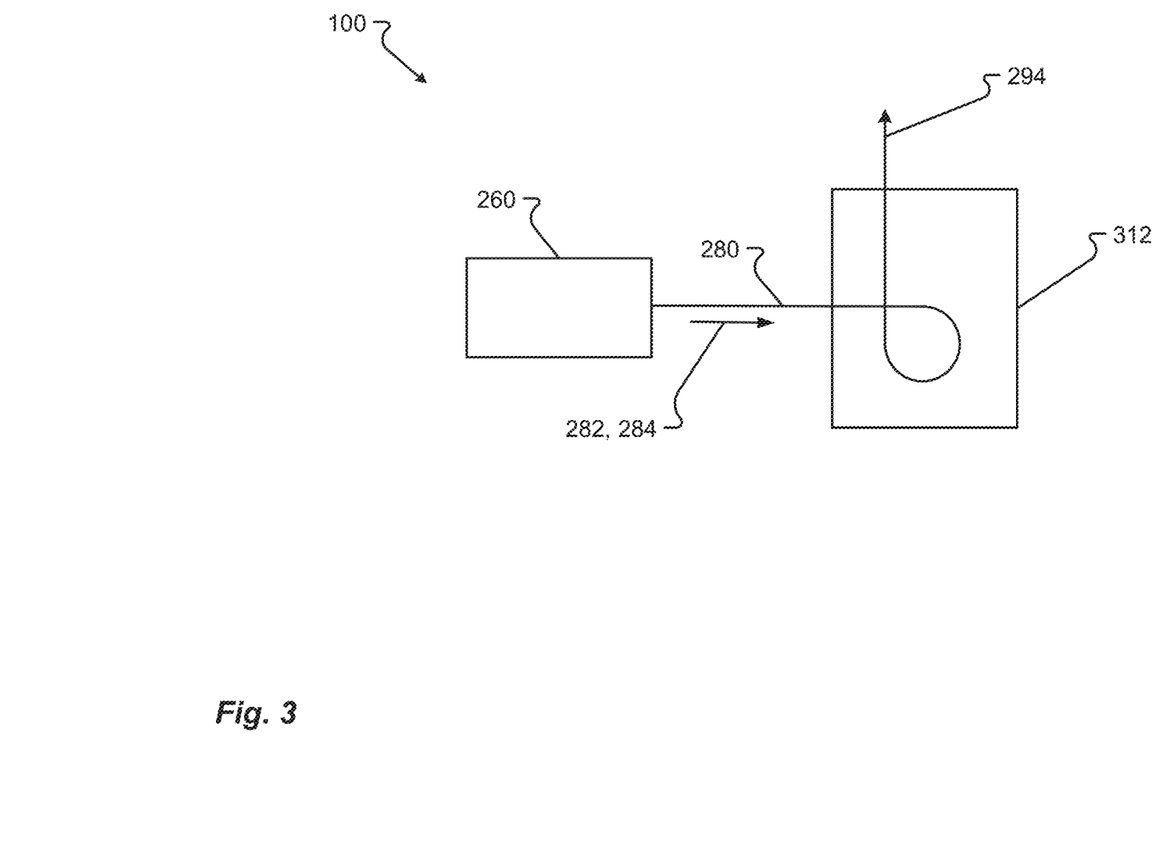
FIG. 3 provides a representation of another embodiment of the charging and optical communication system.

With focus on FIG. 3, a representation of another embodiment of the charging and optical communication system is provided. Generally, a laser and diffusive fiber charging, illumination, and communication device with PV array is provided. This embodiment may be particularly useful to provide an optical charging solution through the use of laser LEDs for car panels, and/or communication and data transfer through fiber (or LED or laser), and/or illumination to the panel. In the embodiment of FIG. 3, the LED transmitter 260 of the transmitter/charger 200 emits (optical) power one 282 and/or optical communication one 284 through a diffusive fiber 280, which in turn emits optical energy and/or optical communications signal(s) to and/or within solar cell arrays 312 so as to emit optical communication two 294 signal. Stated another way, the laser/LED signal goes through a diffuser fiber, which optically charges PV arrays and/or illuminated panels; a fiber optical communication and/or a bus structure may also be provided. Note that the diffuser fiber diffuse or spreads received light so as to be received by PV arrays/solar cells 312. In one embodiment, one or more wave guides are provided to receive and transmit the laser light.

Figure 4A:
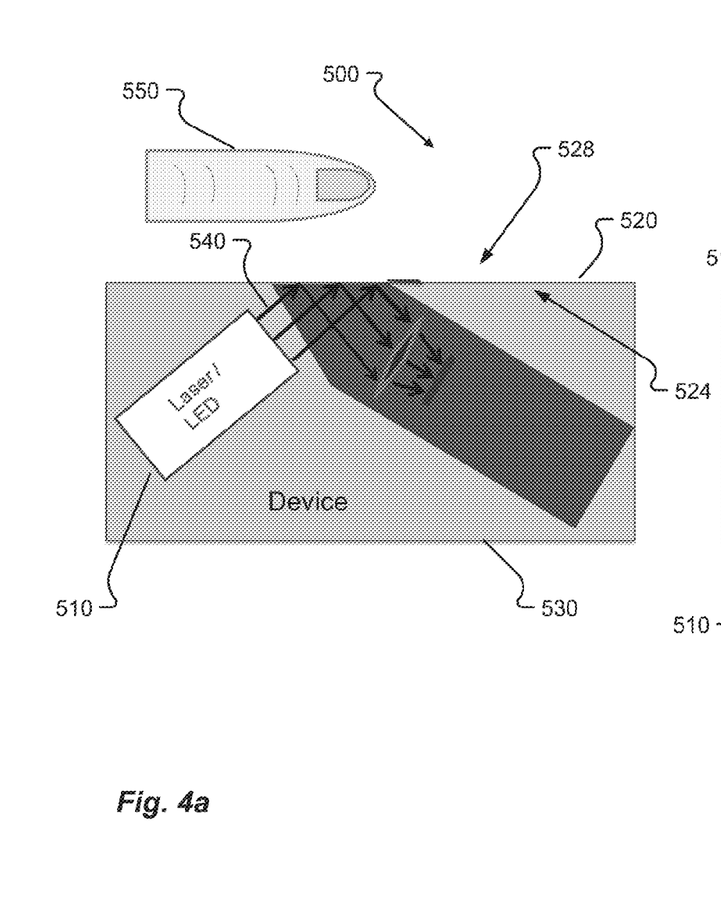
FIG. 4A provides a provides a representation of an optical trigger mechanism, wherein the trigger mechanism is in a first state.
Figure 4B:
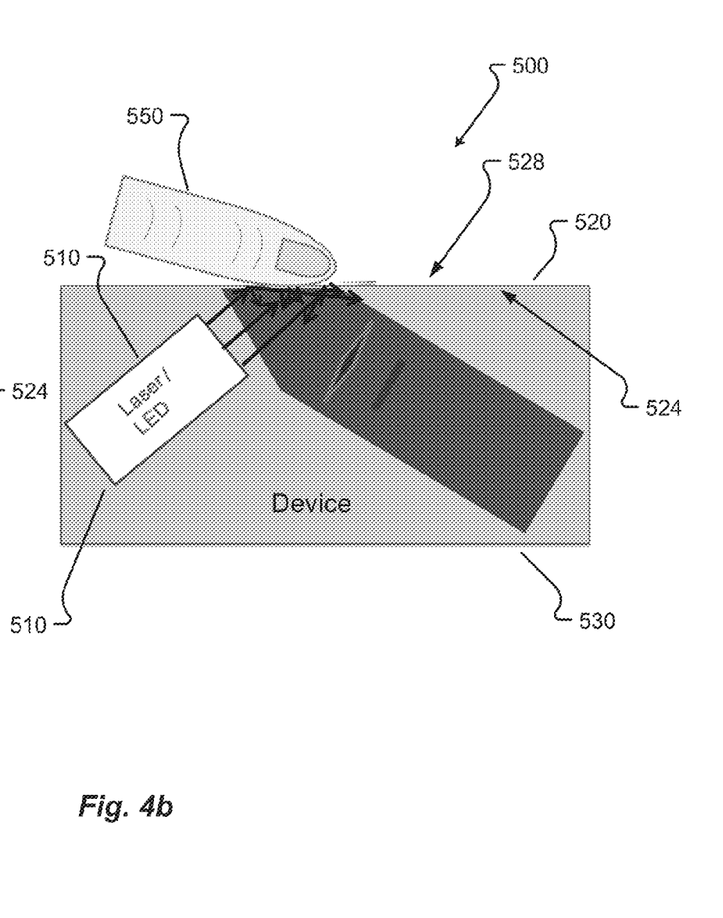
FIG. 4B provides a provides a representation of an optical trigger mechanism, wherein the trigger mechanism is in a second state.

With focus on FIGS. 4A-B, in yet another embodiment, an optical activation trigger switch 500 using finger tapping is disclosed. Generally, light interruption in any form, i.e. finger, blockage, etc in order to wake or activate an electronic device, is utilized. In dark environments, the principle of frustrated total internal reflection is employed. Problems addressed by this embodiment comprise: products often have buttons for power and activation, but this technology may eliminate the need for a button mechanism. FIG. 4A provides a representation of an optical trigger switch 500 mechanism which may serve as a component of the charging and optical communication system 100 disclosed above, wherein the trigger mechanism is in a first state. FIG. 4B provides a representation of an optical trigger switch 500 mechanism which may serve as a component of the charging and optical communication system, wherein the trigger mechanism is in a second state.

Trigger switch 500 comprises a light source 510, such as a laser/LED, which emits an optical signal 540, a surface barrier 520 comprising an internal reflective surface 524 and exterior surface 528, and a host device 530 which is engaged with or contains the light source 510 and the surface barrier 520. The trigger switch may operate in at least a first state (depicted as FIG. 4A) and a second state (depicted as FIG. 4B). In either state, the light source 510, disposed within the host device 530, emits an optical signal 540 directed at the internal reflective surface 524. In the first state of FIG. 4A, the optical signal 540 reflects from the internal reflective surface 524 and back into the host device 530. In one embodiment, the surface barrier is disposed on or near a boundary of the host device 530, such as on or parallel to a side or edge of the host device 530. In the first operational state of the trigger switch, the optical signal 540 is substantially or completely reflected back into the host device; this is termed "total internal reflection." In this state, the optical signal 540 travels up and back down from the surface barrier 520 and may be considered to complete a signal or provide an "on" switch position. (Note that in FIG. 4A the optical signal 540 is shown passing through a lens prior to receipt by a PV cell.) In contrast, in the second state of the trigger switch 500 depicted in FIG. 4B, an external source 550 (here, a human finger) engages the surface barrier exterior surface 528, wherein the optical signal 540 is unable or significantly restricted in reflecting from the internal reflective surface 524. In such a situation, the optical signal 540 is termed as scattering or to have encountered "frustrated total internal reflection." In such a situation, the optical signal 540 travels up and then scatters from the surface barrier 520 and may be considered to provide an "off" switch position. In some embodiments, a sensor is provided so as to establish a selectable threshold optical signal 540 strength (to, for example, the lens shown) wherein above the threshold value the switch is considered "on" and below which the switch is considered "off."

In the detailed description, numerous specific details are set forth in order to provide a thorough understanding of the disclosed techniques. However, it will be understood by those skilled in the art that the present techniques may be practiced without these specific details. In other instances, well-known methods, procedures, components and circuits have not been described in detail so as not to obscure the present disclosure.

Although embodiments are not limited in this regard, discussions utilizing terms such as, for example, "processing," "computing," "calculating," "determining," "establishing", "analysing", "checking", or the like, may refer to operation(s) and/or process(es) of a computer, a computing platform, a computing system, a communication system or subsystem, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Although embodiments are not limited in this regard, the terms "plurality" and "a plurality" as used herein may include, for example, "multiple" or "two or more". The terms "plurality" or "a plurality" may be used throughout the specification to describe two or more components, devices, elements, units, parameters, circuits, or the like. For example, "a plurality of stations" may include two or more stations.

It may be advantageous to set forth definitions of certain words and phrases used throughout this document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, interconnected with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, circuitry, firmware or software, or some combination of at least two of the same. It should be noted that the functionality associated with any particular controller may be centralized or distributed, whether locally or remotely. Definitions for certain words and phrases are provided throughout this document and those of ordinary skill in the art should understand that in many, if not most instances, such definitions apply to prior, as well as future uses of such defined words and phrases.

The exemplary embodiments will be described in relation to communications systems, as well as protocols, techniques, means and methods for performing communications, such as in a wireless network, or in general in any communications network operating using any communications protocol(s). Examples of such are home or access networks, wireless home networks, wireless corporate networks, and the like. It should be appreciated however that in general, the systems, methods and techniques disclosed herein will work equally well for other types of communications environments, networks and/or protocols.

For purposes of explanation, numerous details are set forth in order to provide a thorough understanding of the present techniques. It should be appreciated however that the present disclosure may be practiced in a variety of ways beyond the specific details set forth herein.

Furthermore, it should be appreciated that the various links (which may not be shown connecting the elements), including the communications channel(s) connecting the elements, can be wired or wireless links or any combination thereof, or any other known or later developed element(s) capable of supplying and/or communicating data to and from the connected elements. The term module as used herein can refer to any known or later developed hardware, circuit, circuitry, software, firmware, or combination thereof, that is capable of performing the functionality associated with that element. The terms determine, calculate, and compute and variations thereof, as used herein are used interchangeable and include any type of methodology, process, technique, mathematical operational or protocol.

Moreover, while some of the exemplary embodiments described herein are directed toward a transmitter portion of a transceiver performing certain functions, or a receiver portion of a transceiver performing certain functions, this disclosure is intended to include corresponding and complementary transmitter-side or receiver-side functionality, respectively, in both the same transceiver and/or another transceiver(s), and vice versa.

While the above-described flowcharts have been discussed in relation to a particular sequence of events, it should be appreciated that changes to this sequence can occur without materially effecting the operation of the embodiment(s). Additionally, the exact sequence of events need not occur as set forth in the exemplary embodiments. Additionally, the exemplary techniques illustrated herein are not limited to the specifically illustrated embodiments but can also be utilized with the other exemplary embodiments and each described feature is individually and separately claimable.

Additionally, the systems, methods and protocols can be implemented to improve one or more of a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device such as PLD, PLA, FPGA, PAL, a modem, a transmitter/receiver, any comparable means, or the like. In general, any device capable of implementing a state machine that is in turn capable of implementing the methodology illustrated herein can benefit from the various communication methods, protocols and techniques according to the disclosure provided herein.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22nm Haswell, Intel® Core® i5-3570K 22nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, Broadcom® AirForce BCM4704/BCM4703 wireless networking processors, the AR7100 Wireless Network Processing Unit, other industry-equivalent processors, and may perform computational functions using any known or future-developed standard, instruction set, libraries, and/or architecture.

Furthermore, the disclosed methods may be readily implemented in software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with the embodiments is dependent on the speed and/or efficiency requirements of the system, the particular function, and the particular software or hardware systems or microprocessor or microcomputer systems being utilized. The communication systems, methods and protocols illustrated herein can be readily implemented in hardware and/or software using any known or later developed systems or structures, devices and/or software by those of ordinary skill in the applicable art from the functional description provided herein and with a general basic knowledge of the computer and telecommunications arts.

Moreover, the disclosed methods may be readily implemented in software and/or firmware that can be stored on a storage medium to improve the performance of: a programmed general-purpose computer with the cooperation of a controller and memory, a special purpose computer, a microprocessor, or the like. In these instances, the systems and methods can be implemented as program embedded on personal computer such as an applet, JAVA® or CGI script, as a resource residing on a server or computer workstation, as a routine embedded in a dedicated communication system or system component, or the like. The system can also be implemented by physically incorporating the system and/or method into a software and/or hardware system, such as the hardware and software systems of a communications transceiver.

Various embodiments may also or alternatively be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

It is therefore apparent that there has at least been provided systems and methods for laser and optical charging and communications. While the embodiments have been described in conjunction with a number of embodiments, it is evident that many alternatives, modifications and variations would be or are apparent to those of ordinary skill in the applicable arts. Accordingly, this disclosure is intended to embrace all such alternatives, modifications, equivalents and variations that are within the spirit and scope of this disclosure.

What is claimed is:

1. An optical communications and charging system comprising:
a transmitter/charger configured to receive a first communications signal and a power signal from an external source, the transmitter/charger comprising a light source, wherein the transmitter/charger is configured to operate in different selectable modes including a power charging only mode, an optical communications only mode, and both a power charging and optical communications mode, and wherein the light source is configured to transmit the first communications signal and/or the power signal based on a particular selected mode of the different selectable modes;
a lens configured to receive the first communications signal and/or the power signal; and
a target device comprising:
a battery; and
a PV cell in communication with the battery, the target device configured to receive, at the PV cell, the first communications signal and/or the power signal transmitted by the light source, the target device configured to transmit a second communications signal to the transmitter/charger;
wherein the power signal received by the target device enables the PV cell to charge the battery, and wherein the first communications signal received by the target device is demodulated via the PV cell.

2. The system of claim 1, wherein the light source is a laser/LED diode.

3. The system of claim 2, wherein the power received by the transmitter/charger is received via at least one of a USB connector and a wireless connector.

4. The system of claim 1, wherein the transmitter/charger and the lens are components of a common enclosure structure.

5. The system of claim 4, wherein the common enclosure structure further comprises a photon detector configured to receive the second communications signal.

6. The system of claim 5, wherein the target device outputs the second communications signal to the photon detector.

7. The system of claim 4, wherein the target device and the common enclosure structure of transmitter/charger are not in physical communication, and the light source wirelessly transmits the first communications signal and/or the power signal.

8. The system of claim 1, further comprising a modulator configured to manage the first and the second communications signals.

9. The system of claim 1, wherein the first communication signal comprises data to enable a software update of the targeted device.

10. A method of optical communications and charging, the method comprising:
providing an optical communications and charging system comprising:
a transmitter/charger configured to receive a first communications signal and a power signal from an external source, the transmitter/charger comprising a light source, wherein the transmitter/charger is configured to operate in different selectable modes including a power charging only mode, an optical communications only mode, and both a power charging and optical communications mode, and wherein the light source is configured to transmit the first communications signal and/or the power signal based on a particular selected mode of the different selectable modes; a lens configured to receive the first communications signal and/or the power signal; and a target device comprising a battery and a PV cell in communication with the battery, the target device configured to receive, at the PV cell, the first communications signal and/or the power signal transmitted by the light source, the target device configured to transmit a second communications signal to the transmitter/charger;
engaging the transmitter/charger charging device with an external source;
providing a first communications signal and/or a power signal to the transmitter/charger from the external source;
transmitting the first communications signal and/or the power signal from the light source of the transmitter/charger to the target device based on the particular selected mode of the different selectable modes; and
determining whether the first communications signal and/or the power signal comprises the power signal;
wherein, upon determining that the transmitted first communications signal and/or the power signal comprises the power signal, the PV cell receives the power signal and the battery is charged; and
wherein, upon determining that the transmitted first communications signal and/or the power signal comprises the first communications signal, the first communications signal received by the target device is demodulated via the PV cell.

11. The method of claim 10, wherein the light source is a laser/LED diode.

12. The method of claim 10, wherein the power received by the transmitter/charger is received via at least one of a USB connector and a wireless connector.

13. The method of claim 12, wherein the transmitter/charger and the lens are components of a common enclosure structure.

14. The method of claim 13, wherein the common enclosure structure further comprises a photon detector configured to receive the second communications signal.

15. The method of claim 14, wherein the target device outputs the second communications signal to the photon detector.

16. The method of claim 13, wherein the target device and the common enclosure structure of transmitter/charger are not in physical communication, and the light source wirelessly transmits the first communications signal and/or the power signal.

17. The method of claim 10, further comprising a modulator configured to manage the first and the second communications signals.

18. The method of claim 10, wherein the first communication signal comprises data to enable a software update of the targeted device.

* * * * *